(12) United States Patent
Gu (10) Patent No.: US 11,142,271 B1
(45) Date of Patent: Oct. 12, 2021

(54) VERTICAL WALL-MOUNTED BICYCLE RACK

(71) Applicant: Haidong Gu, Pomona, CA (US)

(72) Inventor: Haidong Gu, Pomona, CA (US)

(73) Assignee: CYCLINGDEAL USA, INC., Pomona, CA (US)

( * ) Notice: Subject to any disclaimer, the term of this patent is extended or adjusted under 35 U.S.C. 154(b) by 0 days.

(21) Appl. No.: 17/159,085

(22) Filed: Jan. 26, 2021

(51) Int. Cl.
*B62H 3/06* (2006.01)
*B62H 3/12* (2006.01)

(52) U.S. Cl.
CPC ............... *B62H 3/06* (2013.01); *B62H 3/12* (2013.01)

(58) Field of Classification Search
CPC ... B62H 3/06; B62H 3/12; B62H 3/00; B62H 3/04; A47F 5/08; A47F 5/0876; A47F 5/0006; A47F 5/0093; A47F 5/0807; A47F 5/0892; A47G 25/0678; A47G 25/065; A47G 29/083; A47G 25/06; A47G 25/1457; A47G 25/746; F16B 45/00; F16B 45/02
USPC .... 248/304, 339, 215, 690, 294.1, 308, 306; 211/100, 17–21, 87.01, 5, 96, 104, 118, 211/99, 195, 89.01, 105.2, 106.01, 115
See application file for complete search history.

(56) References Cited

U.S. PATENT DOCUMENTS

| | | | | |
|---|---|---|---|---|
| 61,590 A * | 1/1867 | Whitmarsh et al. | ... | F16M 11/10 248/294.1 |
| 1,200,736 A * | 10/1916 | Laganke | ............. | A47G 25/065 248/294.1 |
| 1,525,533 A * | 2/1925 | Brown | ............. | A47H 5/09 211/96 |
| 1,822,734 A * | 9/1931 | Harrington | ............. | A47G 25/746 211/120 |
| 4,051,953 A * | 10/1977 | Shoaf | ............. | D06F 53/04 211/119.1 |
| 4,880,192 A * | 11/1989 | Vom Braucke | ........ | A47L 13/512 248/110 |
| 5,044,505 A * | 9/1991 | Spratt | ............. | A47B 57/54 211/22 |
| 5,372,287 A * | 12/1994 | Deguevara | ............. | B60R 9/06 224/309 |
| 7,429,024 B2 * | 9/2008 | Boklund-Moran | ............. | A47G 29/083 16/429 |
| 7,681,851 B1 * | 3/2010 | Osterholt | ............. | A47G 25/065 248/308 |
| 2006/0289714 A1 * | 12/2006 | Boklund-Moran | ............. | A47G 29/083 248/339 |
| 2019/0387883 A1 * | 12/2019 | Meyer | ............. | A47B 95/00 |

\* cited by examiner

*Primary Examiner* — Hiwot E Tefera (57) ABSTRACT

A vertical wall-mounted bicycle rack includes a fixing main body and a hanger rod, and the hanger rod is movably assembled with the fixing main body, and an opening direction of the hanger rod can be changed, so that the hanger rod can be inserted through the fixing main body in a right side direction or a left side direction and locked and positioned by nut, thereby preventing the hanger rod from separating from the fixing main body. A user can mount the hanger rod with the opening direction toward right side or left side of the fixing main body upon usage environment, and a bicycle can be inserted through the opening from the right side direction or left side direction, to hung on the vertical wall-mounted bicycle rack.

5 Claims, 10 Drawing Sheets

VERTICAL WALL-MOUNTED BICYCLE RACK

BACKGROUND OF THE INVENTION

1. Field of the Invention

The present invention is related to a wall-mounted rack, and more particularly to a wall-mounted rack for vertical hanging bicycle at a position close to a wall.

2. Description of the Related Art

Common ways of packing bicycles indoors are to use floor-standing bicycle racks, horizontal wall-mounted bicycle racks or vertical wall-mounted bicycle racks, for example, Taiwan Utility Model Patents No. M593355, M568806 and M567723, and U.S. Ser. No. 10/252,759B2 and U.S. Ser. No. 10/618,582B1 disclose floor-standing bicycle racks; Taiwan Utility Model Patent No. M563990 and U.S. Ser. No. 10/822,045B1 disclose horizontal wall-mounted bicycle racks; Taiwan Utility Model Patent No. M563990 discloses a vertical wall-mounted bicycle rack. Because of being very simple to install, small in size, and not occupying environmental space, the vertical wall-mounted bicycle racks are very popular for people having limited environmental spaces.

The aforementioned Taiwan Utility Model Patent No. M439605 discloses a bicycle rack which is often mounted for use in a corner of a wall to save environmental space, an opening of a hook is located on a right side of the rack, and the bicycle can be hooked from the right side of the rack only, this conventional bicycle rack is unable to be mounted at a right side of the corner near the wall because the bicycle is blocked by the wall on the right side and the bicycle cannot be hung smoothly. The convention bicycle rack is not suitable for use in above-mentioned situation.

SUMMARY OF THE INVENTION

The present invention provides a vertical wall-mounted bicycle rack, and a hook of the vertical wall-mounted bicycle rack can be detached manually, and the opening of the hook can be adjusted to face toward a right side direction or a left side direction, so that the vertical wall-mounted bicycle rack is adapted to mount in a corner without being obstructed by the adjacent wall; furthermore, with the configuration of the bicycle rack of the present invention, it is not necessary for a manufacturer to develop bicycle racks for two directions, so manufacturing cost of the bicycle rack can be decreased.

In order to achieve the aforementioned objective and effect, the present invention is to provide a vertical wall-mounted bicycle rack including a fixing main body and a hanger rod. The fixing main body includes a mounting wall base and a support base. The support base is disposed on a top of the mounting wall base and includes a top part, a right side pan and a left side part, and sides of the right side part and the left side part are connected to two sides of the top part, respectively, the right side part and the left side part respectively have a right side hole and a left side hole corresponding to each other, and each of the left side hole and the right side hole has a non-circular cross section. The hanger rod includes a livelock section, a hook section, and an axle section connected to the livelock section and the hook section. The axle section and the livelock section are arranged in the same axial direction, and the hook section is bent and extended toward the livelock section and spaced apart from the livelock section to form an opening, the axle section of the hanger rod is movably inserted into the right side hole and the left side hole, and when the livelock section is exposed out of the right side hole and locked by a nut, the opening is located on a right side of the fixing main body, and when the livelock section is exposed out of the left side hole and locked by the nut, the opening is located on a left side of the fixing main body.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise.

As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include", and variations such as "comprises", "comprising", "includes", or "including", will be acknowledged to imply the inclusion of stated elements but not the exclusion of any other elements.

Please refer to FIGS. 1 to 4. As shown in FIGS. 1 to 4, a vertical wall-mounted bicycle rack 100 includes a fixing main body 200 and a hanger rod 300, and the fixing main body includes a mounting wall base 210 and a support base 220. The support base 220 is disposed on a top of the mounting wall base 210, the support base 220 includes a top part 221, a right side part 222 and a left side part 223, and sides of the right side part 222 and the left side part 223 are connected to two sides of the top part 221, respectively. The right side part 222 and the left side part 223 respectively have a right side hole 224 and a left side hole 225 corresponding to each other, and each of the left side hole 225 and the right side hole 224 has a non-circular cross section. The hanger rod 300 includes a livelock section 310, a hook section 320, and an axle section 330 connected to the livelock section 310 and the hook section 320. The axle section 330 and the livelock section 310 are arranged in the same axial direction, and the hook section 320 is bent and extended toward the livelock section 310 and spaced apart from the livelock section 310 to form an opening 340. The axle section 330 of the hanger rod 300 is movably inserted into the right side hole 224 and the left side hole 225, and when the livelock section 310 is exposed out of the right side hole 224 and locked by a nut 400, the opening 340 is located on the right side of the fixing main body 200, and when the livelock section 310 is exposed out of the left side hole 225 and locked by the nut 400, the opening 340 is located on the left side of the fixing main body 200.

The nut 400 has a lateral dimension greater than a lateral sectional dimension of each of the right side hole 224 and the left side hole 225, so the nut 400 can be abutted against an outer surface of the left side part 223 or right side part 222 when the nut 400 is locked with the livelock section 310. Furthermore, the livelock section 310 has a radial dimension smaller than a diameter of each of the right side hole 224 and the left side hole 225, so that the livelock section 310 can be movably inserted into the right side hole 224 and the left side hole 225 without being obstructed. For example, in an embodiment, each of the aforementioned right side hole 224 and the left side hole 225 is in an octagonal shape, and the axle section 330 also has an octagonal cross section.

Please refer to FIGS. 1 to 4 and 7. The right side part 222 and the left side part 223 are respectively connected to the two sides of the top part 221, and the top part 221, the right side part 222 and the left side part 223 are integrally connected to the mounting wall base 210, so that the hanger rod 300 can be inserted through the support base 220 and used to hang the bicycle 500, and the weight of the bicycle 500 can be distributed to the mounting wall base 210 through the right side part 222, the left side part 223 and the top part 221, thereby achieving the effect of stably supporting the bicycle 500.

The hanger rod 300 of the present invention can be movably assembled with the main body 200, and the direction of the opening 340 of the hanger rod 300 can be changed, so that the axle section 330 of the hanger rod 300 can be inserted through the left side hole 225 and the right side hole 224 from the right side or left side of the fixing main body 200, to position in the left side hole 225 and the right side hole 224, and the nut 400 is then locked on the livelock section 310 to prevent the hanger rod 300 from separating from the fixing main body 200 in the direction opposite to the livelock section 310. According to the usage environment, a user can mount the hanger rod 300 to make the opening 340 face toward right side or left side of the fixing main body, so that the user can hang a bicycle (not shown in figures) on the hook section 320 across the opening 340 from right side or left side of the fixing main body 200. As a result, the vertical wall-mounted bicycle rack of the present invention provides the user to freely select the direction of the opening 340 to fasten the mounting wall base 210 on the wall in the corner.

Figure 5:
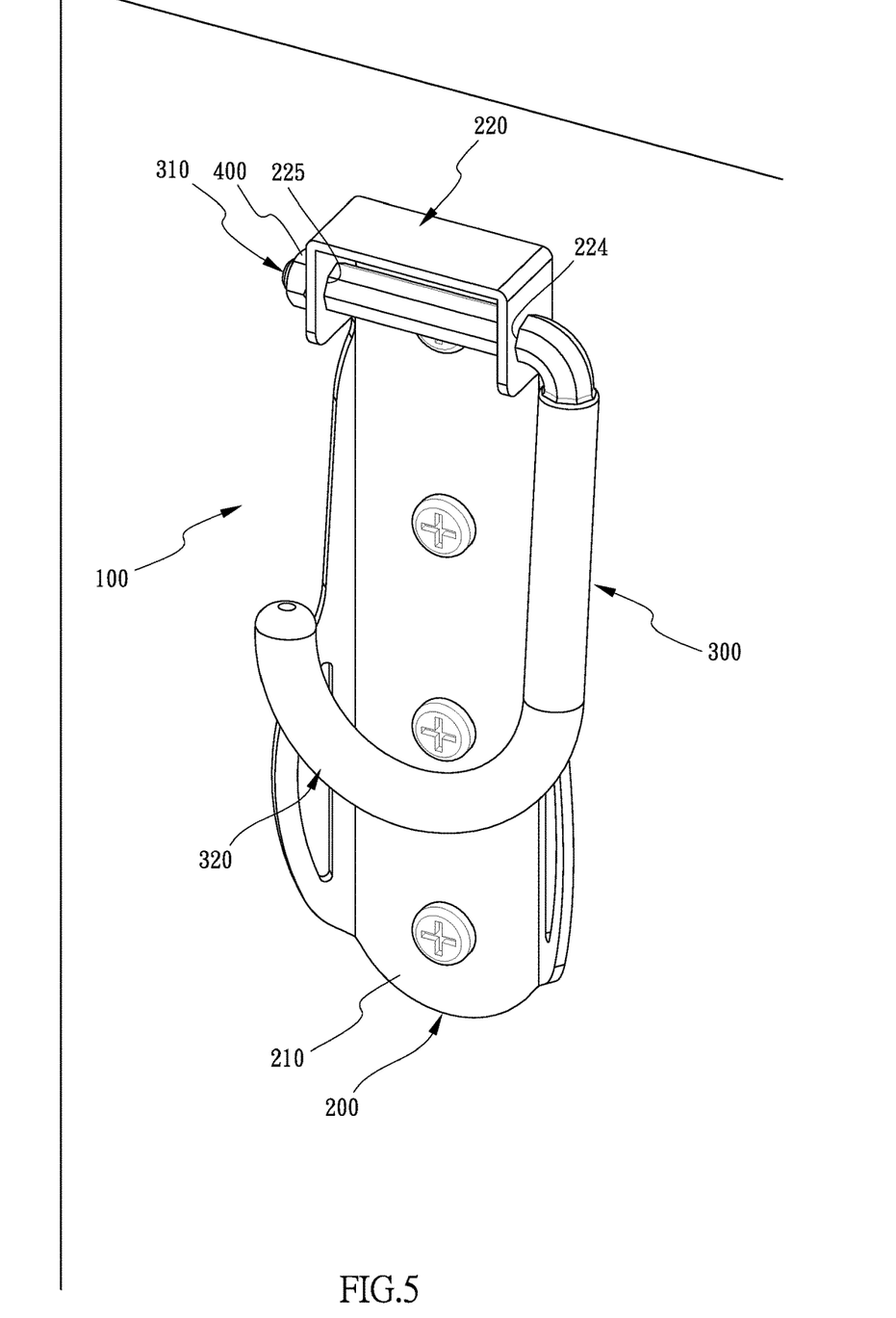
FIG. 5 is a perspective view of a hanger rod stowed close to a fixing main body, according to the present invention.

It is worth noting that, in the present invention, the nut 400 is movably locked on the livelock section 310, each of the left side hole 225 and the right side hole 224 is a non-circular hole, and the axle section 330 corresponds in cross section shape to the left side hole 225 and the right side hole 224; after the axle section 330 is pulled away from the left side hole 225 and the right side hole 224, the axle section 330 can be adjusted in radial rotation angle to re-insert into and re-position in the left side hole 225 and the right side hole 224, so that the hook section 320 of the hanger rod 300 can be close to the mounting wall base 210 or directly attached with the mounting wall base 210, as shown in FIG. 5, and the hook section 320 is not extended in the direction opposite to the wall. As a result, the environmental space occupied by the hanger rod 300 can be reduced when no bicycle 500 is hung on the hanger rod 300.

The detailed features of and assembling relationships between the components of the present invention will be illustrated in detail in following paragraphs. The mounting wall base 210 includes a right joint plate 211 and a left joint plate 212 outwardly integrally extended from two sides thereof, respectively, and the right joint plate 211 and the left joint plate 212 have a right through hole 213 and a left through hole 214, respectively. With the configuration of disposing the right joint plate 211 and the left joint plate 212 on two sides of the mounting wall base 210, wheel sets of the bicycle 500 hung on the hanger rod 300 can be restrained in left and right side directions, so as to prevent the wheel sets of the bicycle 500 from directly separating from the two sides of the mounting wall base 210, thereby achieving the effect of improving stability of hanging the bicycle (not shown in figures). The right through hole 213 formed on the right joint plate 211 and the left through hole 214 formed on the left joint plate 212 can reduce the overall weight of the fixing main body 200.

Generally, the mounting wall base 210 and the support base 220 can be formed by a bending forming process, and the right joint plate 211 and the left joint plate 212 are not integrally connected to the right side part 222 and the left side part 223, so that the processing machine can perform the bending process to separately form the right joint plate 211, the left joint plate 212, the right side part 222 and the left side part 223 without being influenced by the other bent part.

Particularly, the support base 220 has an insertion groove 226 formed and surrounded by the top part 221, the right side part 222 and the left side part 223. The insertion groove 226 has a viewable opening 227 formed thereon and facing outwardly. With the configuration of the insertion groove 226 and the viewable opening 227, an operator can determine the position relationship between the livelock section 310 and the axle section 330 of the hanger rod 300 and the left side hole 225 and the right side hole 224 through the viewable opening 227 and the insertion groove 226, and it is beneficial for the process of assembling the hanger rod 300 and the fixing main body 200.

Figure 1:
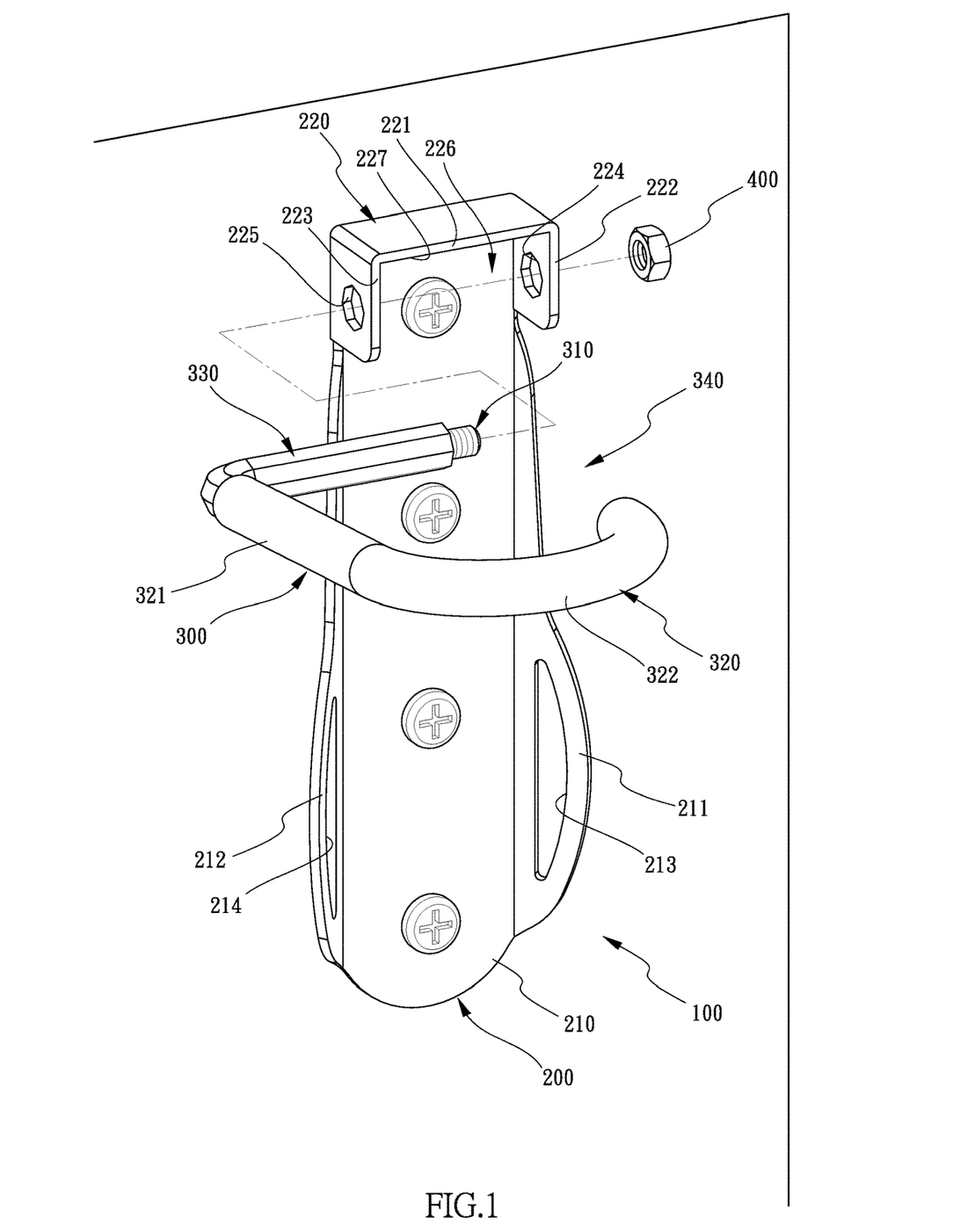
FIG. 1 is a perspective exploded view of a vertical wall-mounted bicycle rack having a rightward opening, according to the present invention.
Figure 2:
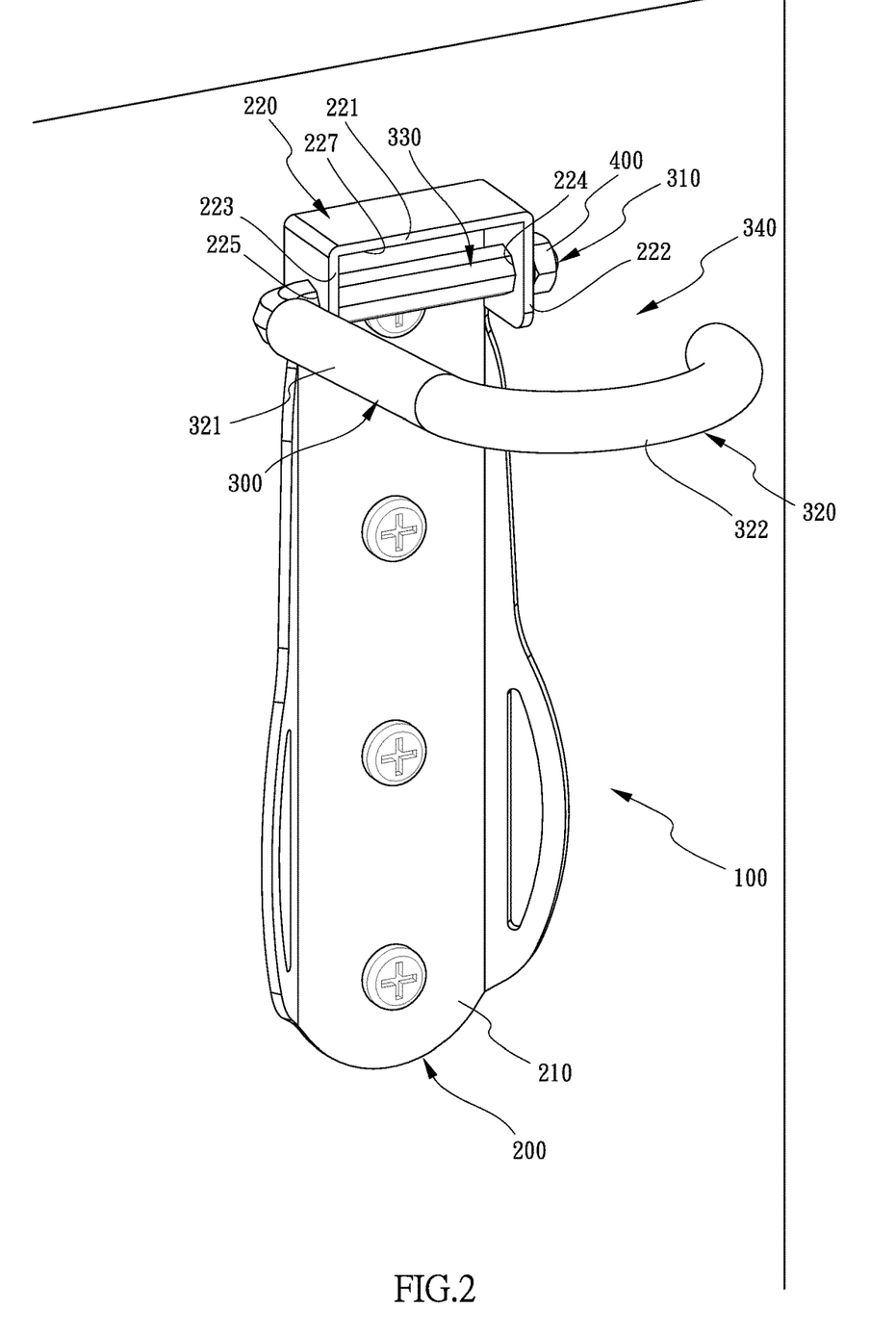
FIG. 2 is a perspective assembly view of the vertical wall-mounted bicycle rack having the rightward opening, according to the present invention.
Figure 3:
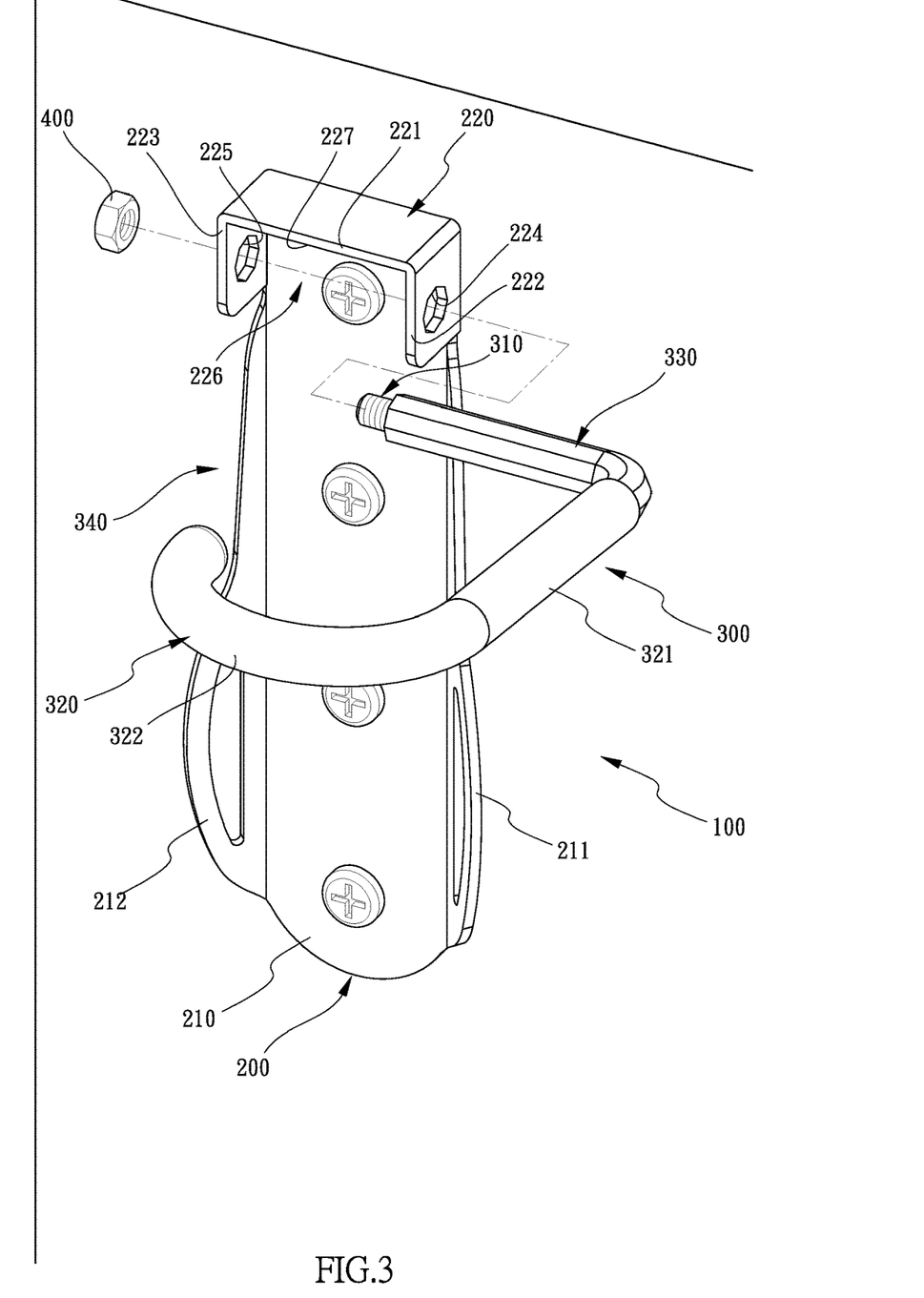
FIG. 3 is a perspective exploded view of a vertical wall-mounted bicycle rack having a leftward opening, according to the present invention.
Figure 4:
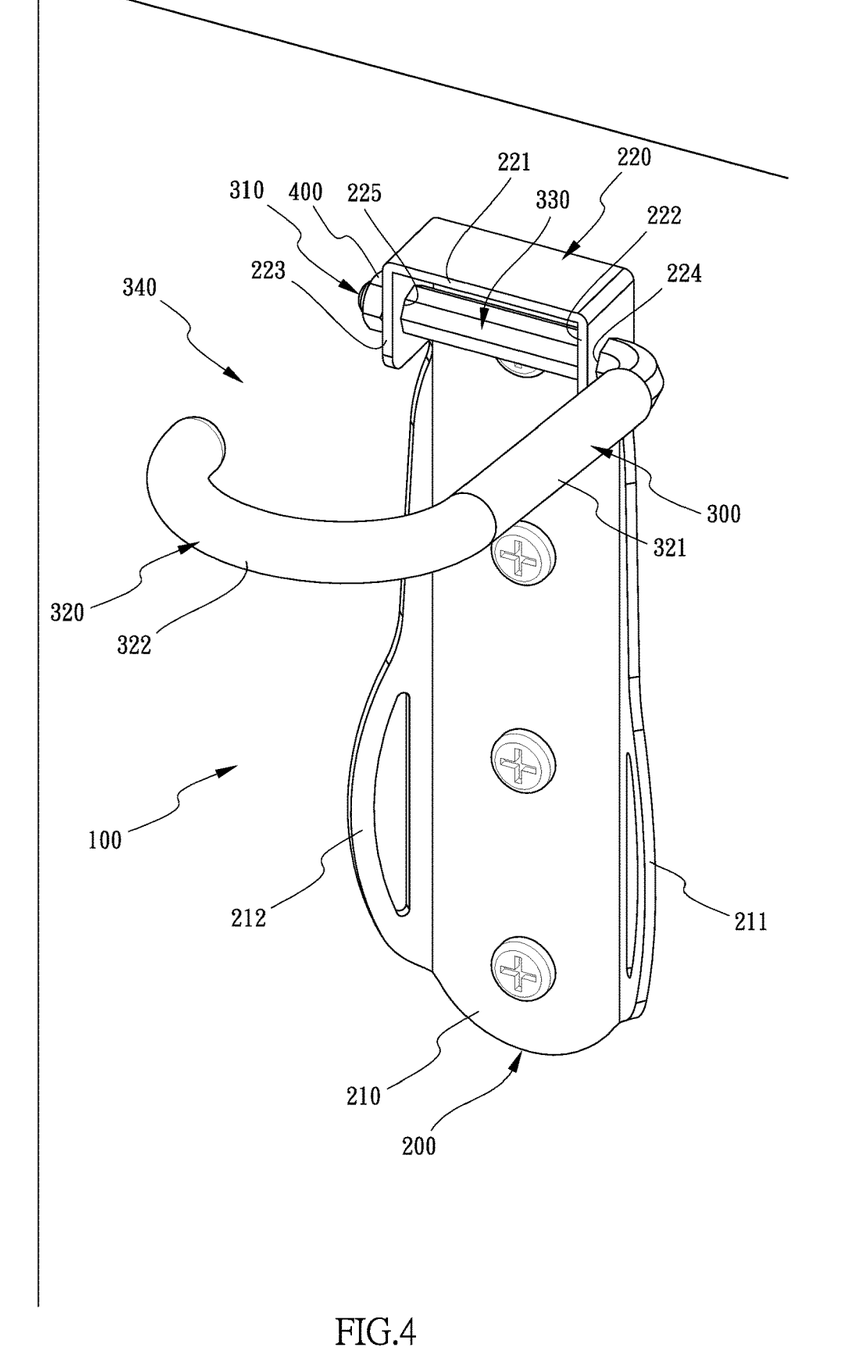
FIG. 4 is a perspective assembly view of the vertical wall-mounted bicycle rack having the leftward opening, according to the present invention.
Figure 6:
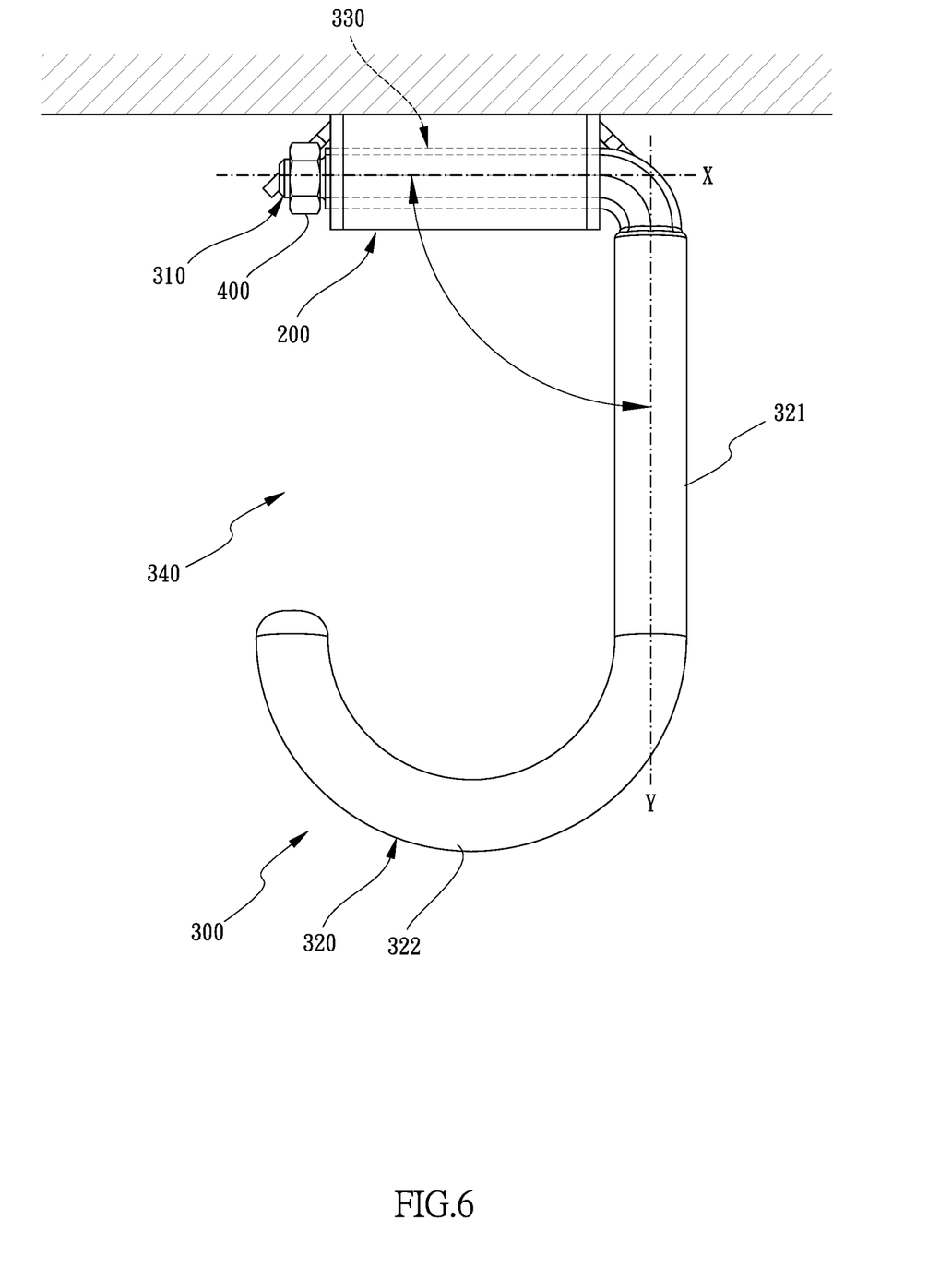
FIG. 6 is a top view of FIG. 4.
Figure 7:
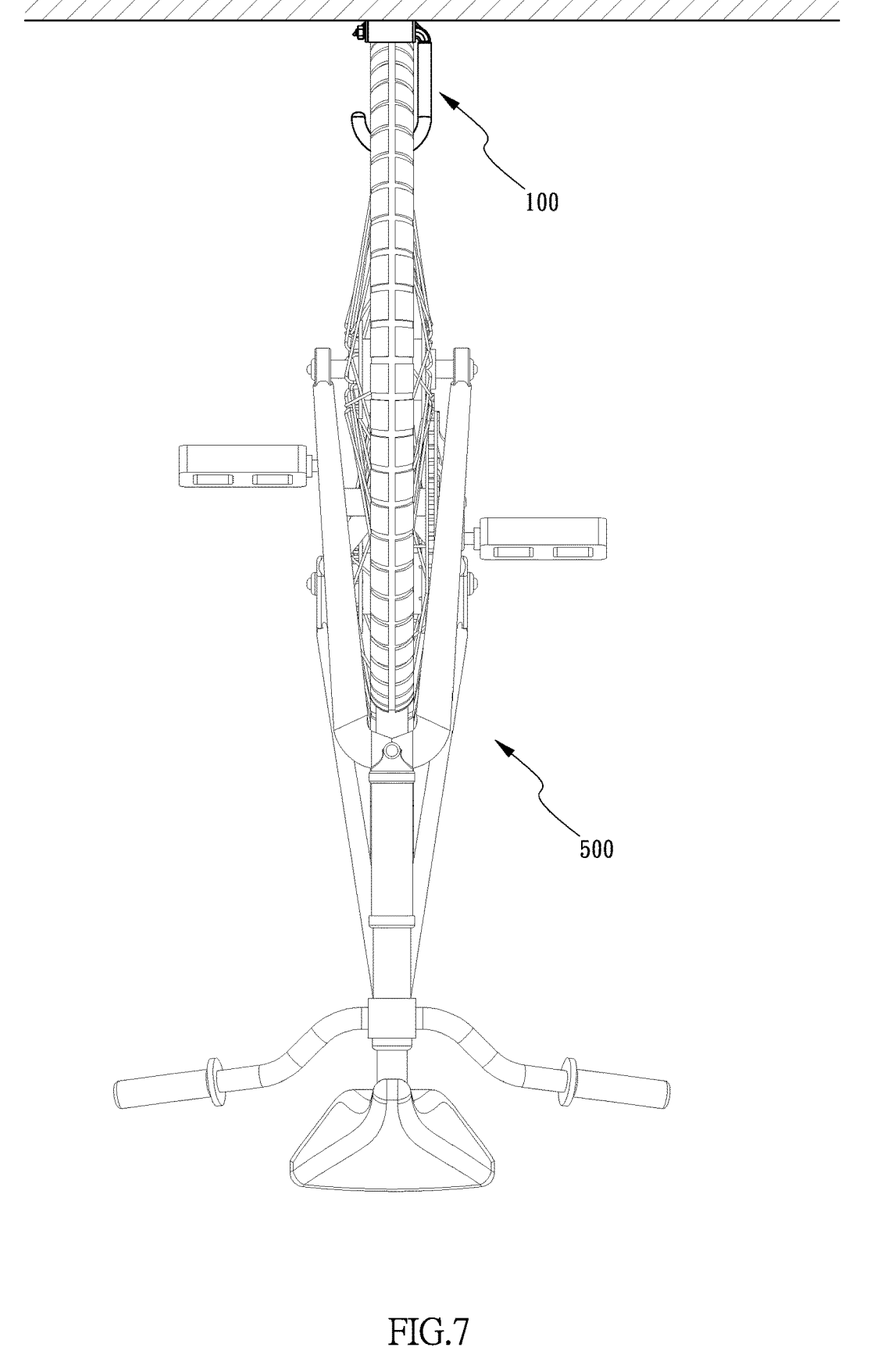
FIG. 7 is a top view of a bicycle hung on a vertical wall-mounted bicycle rack of the present invention.

In the aforementioned embodiment of the present invention, the hook section 320 includes an extension part 321 and a bent part 322, two ends of the extension part 321 are connected to the axle section 330 and the bent part 322, and an included angle of 90 degrees is formed between the extension part 321 and the axle section 330, as shown in FIGS. 3, 4 and 6. The axis along the axle section 33 is defined as an X axis, and the axis along the extension part 321 is defined as a Y axis, and an included angle between the X axis and Y axis is the aforementioned included angle of 90 degrees between the extension part 321 and the axle section 330.

Figure 8:
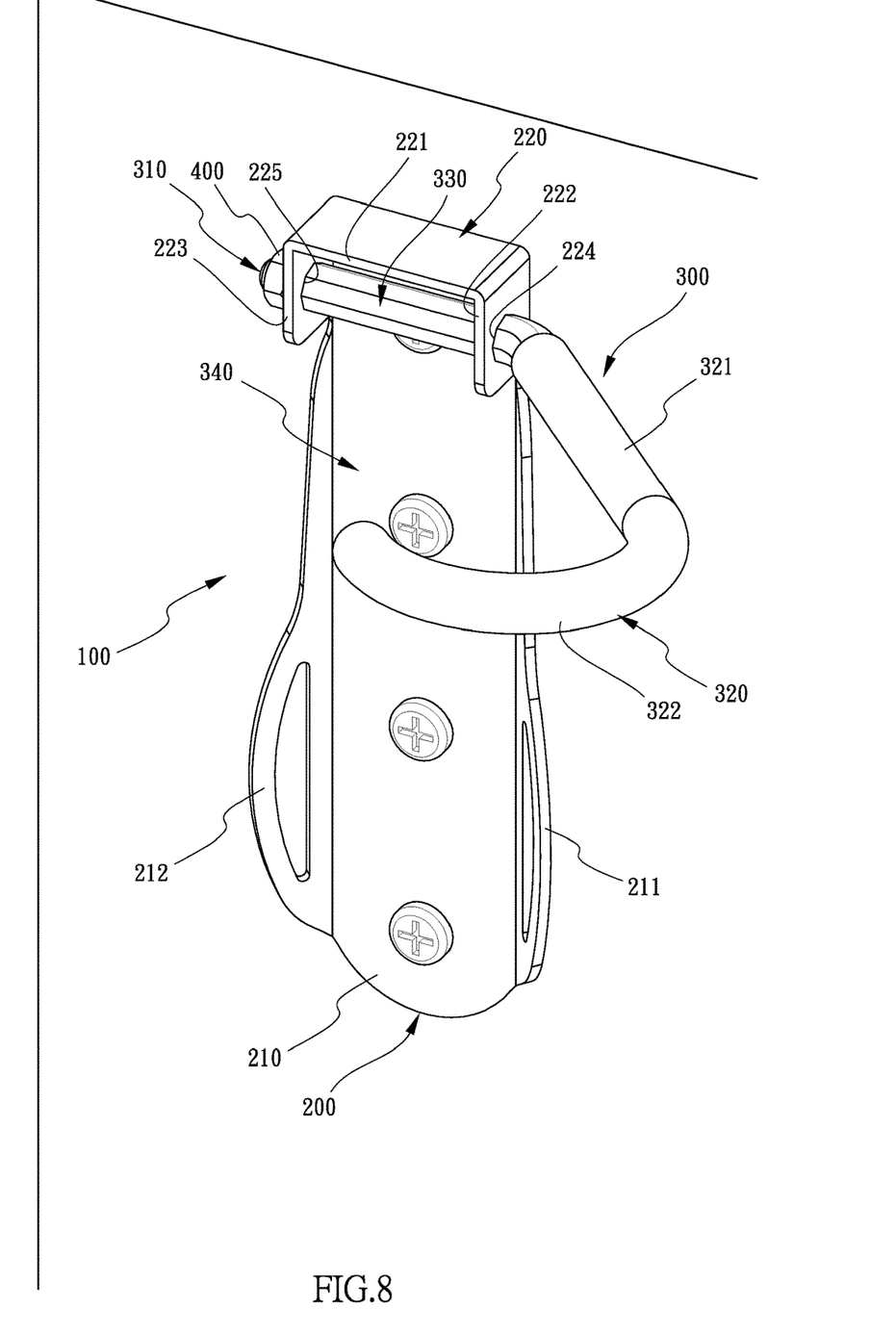
FIG. 8 is a perspective assembly view of a vertical wall-mounted bicycle rack, according to another embodiment of the present invention.
Figure 9:
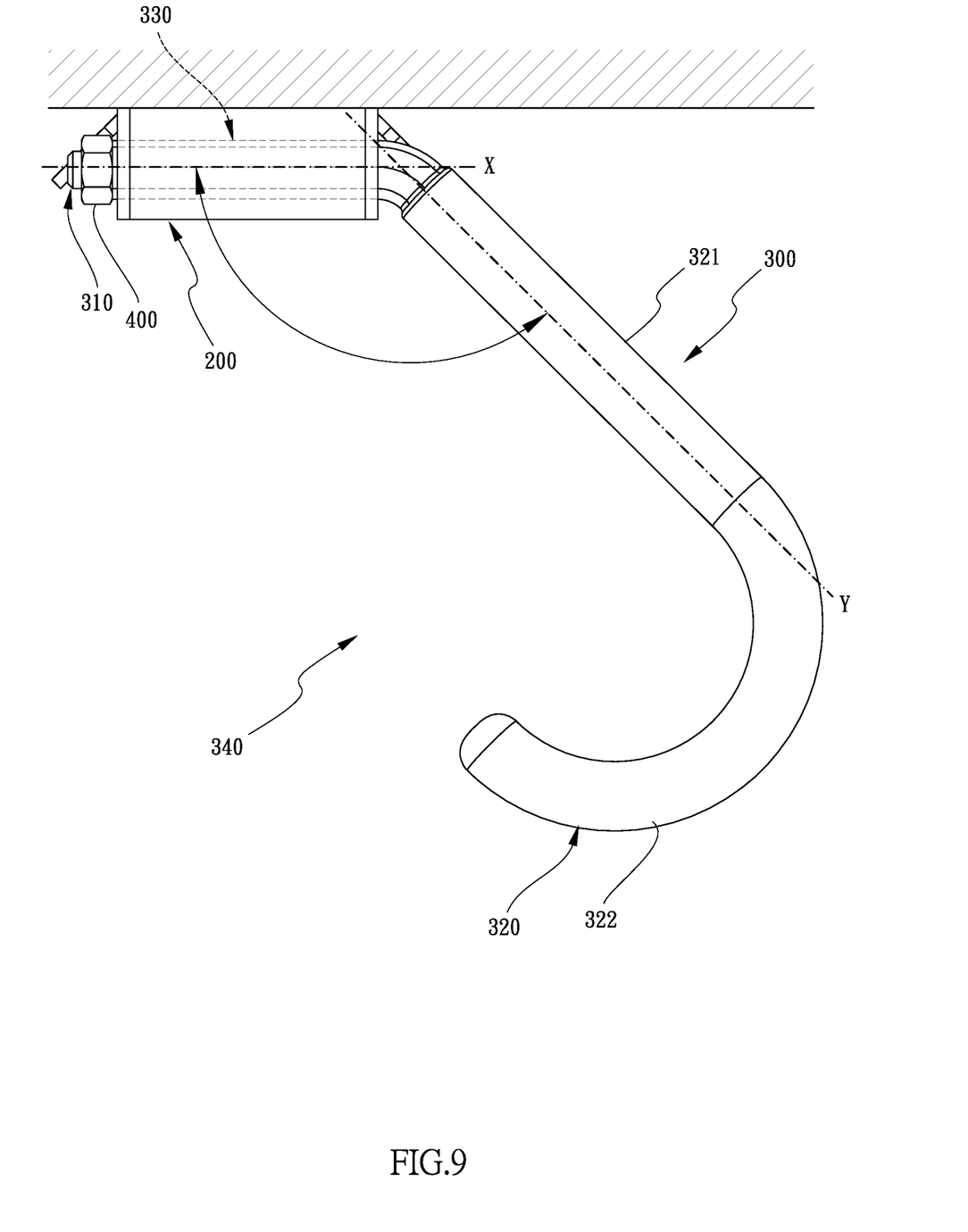
FIG. 9 is a top view of FIG. 8.
Figure 10:
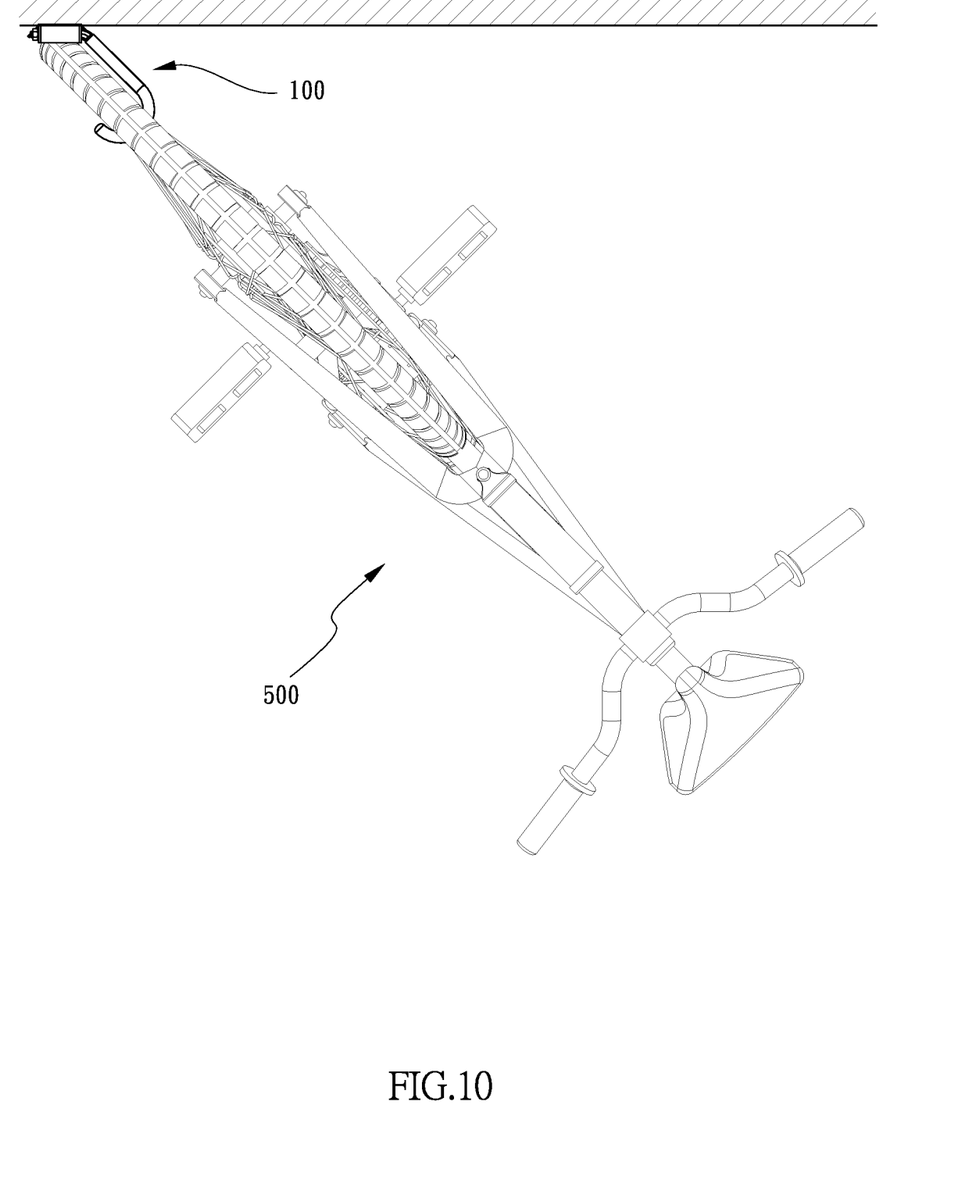
FIG. 10 is a schematic top view of a bicycle hung on the vertical wall-mounted bicycle rack of FIG. 8.

Please refer to FIGS. 8 to 10, which shows a second embodiment of the present invention. The structures of the second embodiment are substantive the same as that of the aforementioned embodiment, and the difference between the second embodiment and the aforementioned embodiment is the types of the hanger rods 300. In the second embodiment, the included angle of 135 degrees is formed between the extension part 321 and the axle section 330. With the configuration of the included angle of 135 degrees between the extension part 321 and the axle 330, the side of the bicycle 500 can be closer to the wall when the bicycle 500 is hung.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A vertical wall-mounted bicycle rack, comprising:
    a fixing main body comprising a mounting wall base and a support base, wherein the support base is disposed on a top of the mounting wall base, the support base comprises a top part, a right side part and a left side part, and sides of the right side part and the left side part are connected to two sides of the top part, respectively, the right side part and the left side part respectively have a right side hole and a left side hole corresponding to each other, and each of the left side hole and the right side hole has a non-circular cross section, the mounting wall base includes a right joint plate and a left joint plate outwardly integrally extended from two sides thereof, respectively, and the right joint plate and the left joint plate have a right through hole and a left through hole, respectively; and
    a hanger rod comprising a livelock section, a hook section, and an axle section connected to the livelock section and the hook section, wherein the axle section and the livelock section are arranged in the same axial direction, and the hook section is bent and extended toward the livelock section and spaced apart from the livelock section to form an opening, the axle section of the hanger rod is movably inserted into the right side hole and the left side hole, and when the livelock section is exposed out of the right side hole and locked by a nut, the opening is located on a right side of the fixing main body, and when the livelock section is exposed out of the left side hole and locked by the nut, the opening is located on a left side of the fixing main body.

2. The vertical wall-mounted bicycle rack according to claim 1, wherein the right joint plate is not connected to the right side part, and the left joint plate is not connected to the left side part.

3. The vertical wall-mounted bicycle rack according to claim 1, wherein the support base has an insertion groove formed and surrounded by the top part, the right side part and the left side part, and the insertion groove has a viewable opening formed thereon and facing outwardly.

4. The vertical wall-mounted bicycle rack according to claim 1, wherein the hook section comprises an extension part and a bent part, two ends of the extension part are connected to the axle section and the bent part, and an included angle of 90 degrees is formed between the extension part and the axle section.

5. The vertical wall-mounted bicycle rack according to claim 1, wherein the hook section comprises an extension part and a bent part, two ends of the extension part are connected to the axle section and the bent part, respectively, and an included angle of 135 degrees is formed between the extension part and the axle section.

\* \* \* \* \*